Figure 1:
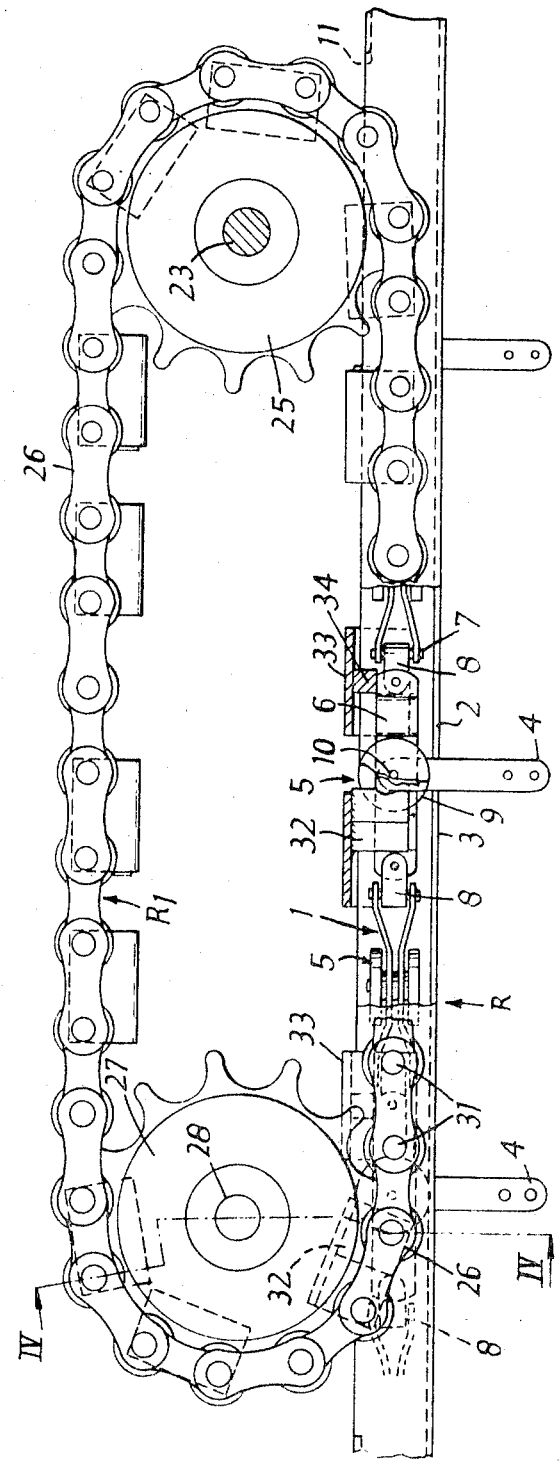

200
United States Patent

Wright

[15] 3,637,067
[45] Jan. 25, 1972

[54] CONVEYOR SYSTEMS
[72] Inventor: Eric L. Wright, Oadby, England
[73] Assignee: Hytrac Conveyors Limited, Leicester, England
[22] Filed: Dec. 23, 1969
[21] Appl. No.: 887,622

[30] Foreign Application Priority Data

Dec. 31, 1968  Great Britain ..................... 61,853/68

[52] U.S. Cl. ............................................................ 198/203
[51] Int. Cl. ........................................................... B65g 23/00
[58] Field of Search ................................. 198/177, 203, 74

[56] References Cited

UNITED STATES PATENTS

| | | | |
|---|---|---|---|
| 802,047 | 10/1905 | Krell | 198/203 |
| 1,960,719 | 5/1934 | Stibbs | 198/203 |
| 2,725,973 | 12/1955 | King | 198/177 |
| 3,387,697 | 6/1968 | Harrison | 198/203 |
| 3,497,056 | 2/1970 | Clark | 198/203 |

Primary Examiner—Richard E. Aegerter
Assistant Examiner—H. S. Lane
Attorney—Larson, Taylor and Hinds

[57] ABSTRACT

Drive unit for a conveyor system comprising a conveyor chain made up of wheeled links connected together end to end and having load carriers depending therefrom. A pair of endless driving chains, each of which extends around a pair of sprockets, are positioned in parallel planes, one on each side of the conveyor element. One sprocket of each pair is driven from a motor, via a self-adjusting pulley and an overload clutch. U-shaped carriers are secured between the driving chains and carry drive dogs arranged to engage from above and drive the conveyor chain when the driving chains are travelling parallel to the conveyor chain.

7 Claims, 4 Drawing Figures

CONVEYOR SYSTEMS

This invention is concerned with conveyor systems of the kind including a linear travelling conveyor element having a plurality of load carriers mounted thereon. A system of this kind will hereinafter be referred to as "a conveyor system of the kind referred to."

In such a conveyor system, the conveyor element may be in the form of an endless chain having load carriers depending from certain of its links and arranged to travel continuously around a fixed path defined by a track. Such a system finds a variety of uses, e.g., for transporting articles from place to place in a factory.

Heretofore, various methods have been employed to drive the conveyor chain along its path in a system of this kind. In one method, an endless driving chain extends around a pair of sprockets which are rotatable about horizontal axes and are arranged so that the lower run of the chain extends above the conveyor element along a part of its path. Driving dogs secured to the chain extend downwardly therefrom for engagement with the conveyor element when travelling along the lower run of the driving chain. However, a disadvantage of this arrangement is that when each dog reaches the end of the lower run of the drive chain, the portion of the latter carrying the dog begins to curve around the relevant sprocket. This causes the lower end of the dog to swing forwardly and upwardly in an arc before becoming disengaged from the conveyor element. As will be appreciated, the outer end of the dog is at this time subjected to an acceleration in the direction of movement of the conveyor element. This acceleration causes a jerk or snag on the conveyor element with obvious detrimental effects on both the conveyor element and on the driving chain and dogs. Also, as a result of this, movement of the conveyor element is erratic.

An object of the invention is to provide a conveyor system of the kind referred to, having a conveyor driving unit which is designed to overcome this problem.

According to the invention, the linear conveyor element of the system is driven by a drive unit comprising at least one elongate driving element carrying drive dogs for engagement with the conveyor element, the or each driving element being arranged to travel in a path, part of which runs alongside the conveyor element in substantially the same plane as the latter, and the arrangement being such that the drive dogs engage the conveyor element during their passage along this portion of the path.

By causing the or each driving element to travel alongside the conveyor element is the same plane as the latter, acceleration of the outer ends of the drive dogs as described in connection with a prior driving arrangement, is obviated. Smooth movement of the conveyor element is thereby promoted and an increase in the life of the components of the system can be expected.

In one embodiment of the invention the or each drive element may be arranged to travel in a path in which it travels alongside the conveyor element, away to one side thereof and then round and back towards the conveyor element. In this event the drive dogs may engage the conveyor element from the side. Preferably however, the path of the or each driving element lies in a plane positioned alongside the conveyor element and parallel to its direction of travel, the drive dogs being arranged to engage the conveyor element from above.

Although it is possible that a single driving element could be employed, the unit preferably includes two such elements arranged in parallel planes one on each side of the conveyor element at a convenient location in its path. For the sake of convenience, reference will hereinafter be confined to such an arrangement.

The driving elements may be of any convenient form and are preferably endless. According to one embodiment of the invention, each said element is constituted by an endless chain which extends around a pair of sprockets adjacent the conveyor path and is arranged to define two parallel rectilinear runs, one rectilinear run of each chain extending parallel to the conveyor element and in the same plane as the latter. One of said sprockets is preferably driven in rotation to cause the chain to circulate in its path. Of course, the rectilinear runs of the two chains at the side of the conveyor element must be arranged to move in the same direction. The chains may be of the so-called "Renold" type.

Preferably, the said sprockets, are arranged to be rotatable about horizontal axes so that each driving chain circulates in a vertical plane as mentioned above. The driving sprockets for the chain may thus be secured on a common drive shaft extending transversely of the conveyor path. Any convenient power source may be employed to rotate this drive shaft, e.g., an electric motor driving through a suitable gearbox.

It will be appreciated that the form of drive dog employed will depend on the form of the conveyor element. Thus, it is primarily the intention that a chain-form conveyor element shall be employed, in which case each dog may be simply constituted by a finger or the like for engagement with the links or with selected links of the chain.

The present invention includes within its scope, for a conveyor system of the kind herein referred to, a drive unit comprising at least one elongate driving element carrying drive dogs for engagement with the conveyor element, the arrangement being such that, in use, the or each driving element runs alongside the conveyor element in substantially the same plane as the latter, and the drive dogs engaging the conveyor element during their passage along this portion of the path.

Figure 2:
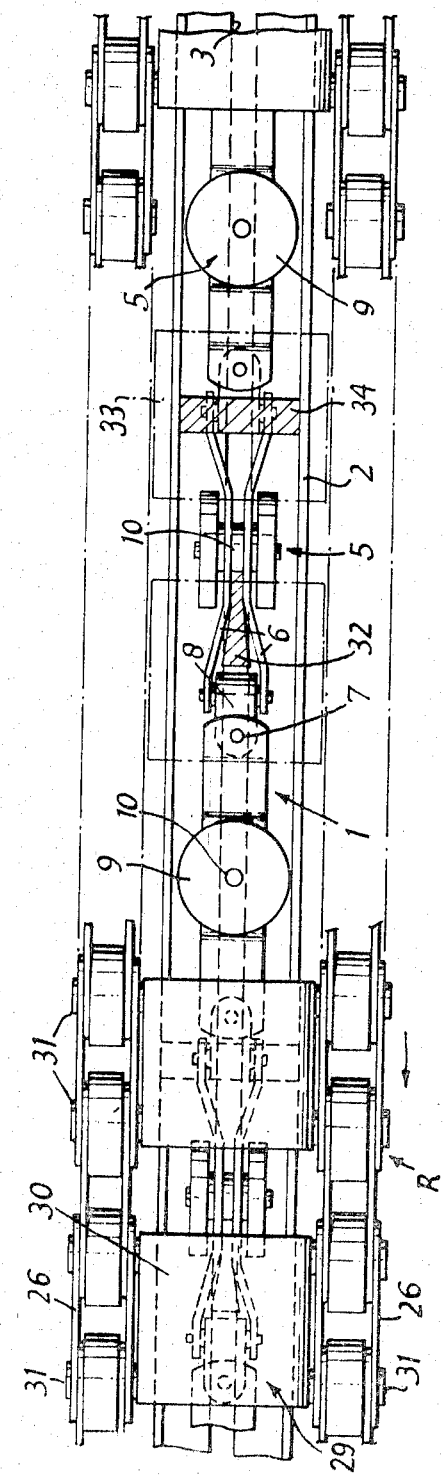
Figure 3:
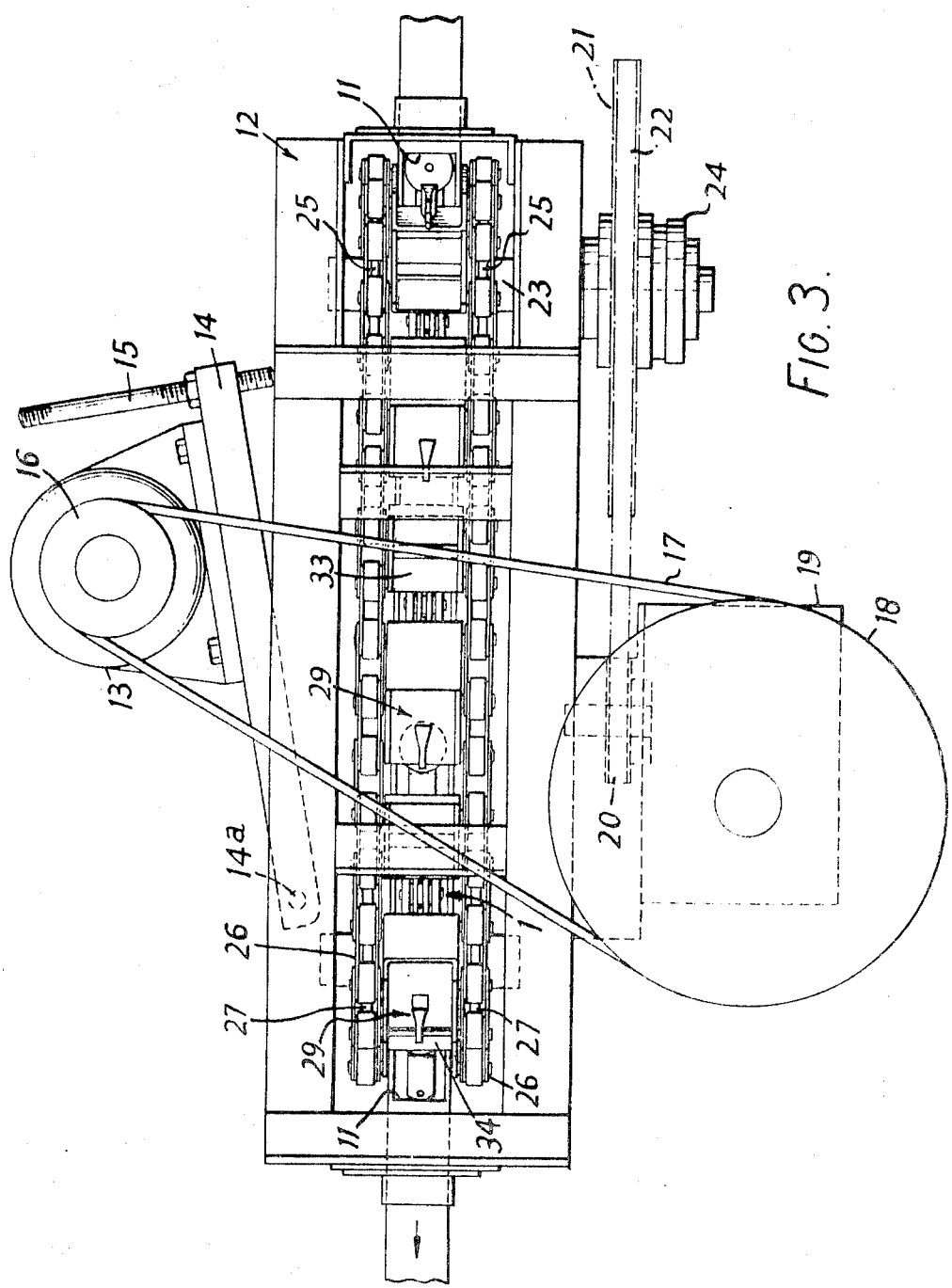
Figure 4:
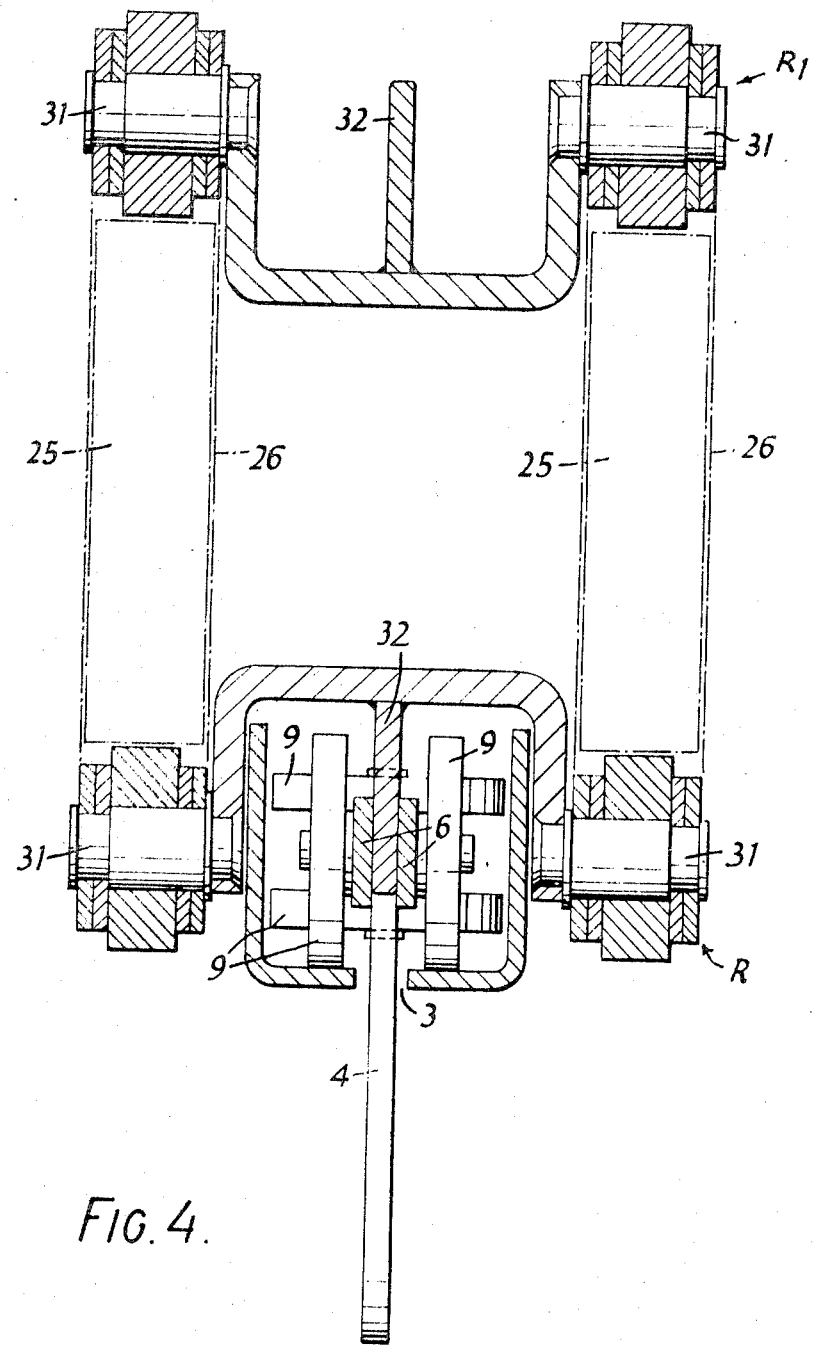

In order that the invention may be more clearly understood and readily carried into practical effect, one specific embodiment thereof will now be described, by way of example, with reference to the accompanying drawings, in which:

FIG. 1 is a side view, partly is section, of part of a conveyor system constructed in accordance with this embodiment, illustrating the drive means for the conveyor chain, FIG. 2 is a plan view corresponding to FIG. 1 with the upper runs of the driving chains omitted, FIG. 3 is a plan view similar to FIG. 2 but on a larger scale showing the compete drive unit, and FIG. 4 is a transverse sectional view on line IV—IV of FIG. 1.

The system comprises an endless conveyor chain, generally designated 1, which runs in a square section track 2 having a continuous longitudinal slot 3 in its underside. Pendants 4, to which work or goods to be transported by the conveyor are secured in any convenient manner, depend from the chain through this slot 3.

The chain comprises a plurality of links 5, each of which is made up of a pair of steel side members 6 which are shaped as shown and are connected together at each end by a rivet 7. The rivet 7 at each end of each link passes through a connecting piece 8 by which that link is connected to adjacent links in the chain. A pair of wheels 9 are mounted on an axle 10 which connects the side members 6 at their centers. These wheels are mounted on axle 10 through fully hardened semiprecision ball races (not visible). As can be seen from the drawings, each alternate link is positioned with its wheels 9 in parallel vertical planes, the wheels 9 of the intervening links extending in parallel horizontal planes. Thus, alternate wheels run on the base of the track 2, whereas the intervening wheels run on the sidewalls thereof. The arrangement can be clearly seen in FIG. 4. It will be noted that, in this embodiment, those links which have vertically disposed wheels each carry one of the above-described pendants 4.

Positioned at an appropriate location around the trackway 2 is a drive unit for the chain 1. The complete unit is illustrated in FIG. 3 of the drawings and will now be described.

The track 2 of the conveyor system runs through the unit from end to end as shown, the upper part thereof being cut away at 11 to provide access to the links 5 of the chain. Mounted on track 2 is the frame 12 of the drive unit. This frame carries an electric drive motor 13 through a base plate 14 which is pivoted to frame 12 at 14a as shown. The end of the base 14 remote from pivot 14a is mounted on a screwed spindle, rotation of which serves to vary the inclination of the base 14 to frame 12. A pulley 16 is mounted on the output shaft to motor 13 and carries a belt 17 for driving a further pulley 18 mounted on the input shaft of a gearbox 19 positioned on the side of frame 12 remote from motor 13. The output shaft of gearbox 19 extends at right angles to its input shaft and carries a sprocket 20 for driving a further sprocket 21 through a chain 22. This sprocket 21 is mounted on a shaft 23 through a clutch 24 arranged to slip in the event that shaft 23 is prevented from turning, thereby constituting a safety device to prevent damage to the mechanism in the event that a jam occurs. Shaft 23 carries a pair of sprockets 25 positioned one on each side of track 2. An endless chain 26 extends around each of these sprockets and around a pair of idler sprockets 27 mounted for free rotation on a shaft 28 at the opposite end of the drive unit. These sprockets 25 and chain 26 are indicated in chain lines in FIG. 4. The arrangement is such that each chain 26 defines two parallel vertically spaced runs R, R₁ alongside track 2 the lower run R of each chain being positioned in the same plane as the conveyor chain 1 (see FIG. 1). Each chain 26 is a conventional type of "Renold" chain comprising a plurality of links pivotally connected together end to end by rivets.

The speed of the chains 26 can be adjusted by changing any of the sprockets or pulleys or by changing the gears in the gearbox 19. In addition, pulley 16 is of a known adjustable type comprising two half pulleys spring-urged together so that the spacing of the halves automatically varies with the tension in the belt 17. This tension can be varied by screwing shaft 15 to alter the inclination of the motor base 14 to frame 12; this causes the effective diameter of the pulley 16 and hence the speed with which it drives pulley 18, to vary.

Extending between chains 26 are driving elements generally designated 29 arranged to engage and drive the conveyor chain 1 when they are travelling along the lower runs of chains 26. Reference will now be made to FIGS. 1 and 2 of the drawings in which the form of these drive elements can be more clearly seen. Each element 29 comprises a U-form plate 30, the lower parts of the sides of which are mounted on two adjacent rivets 31 of each drive chain 26 as can be more clearly seen in FIG. 2. In an alternative arrangement, where the chain has hollow rivets, the plates 30 may be secured to the chain by bolts extending through the rivets. The arrangement is such that the bottom or base of each plate 30, in effect, bridges the track 2 (see FIG. 4). A drive dog 32 depends from plate 30 for engagement with certain links of the chain. As can be seen from FIG. 2, this dog 32 is of generally triangular shape having an extended end portion 32a and is shaped so as to fit between the side members 6 and the relevant connecting piece 8 of a link. In the embodiment illustrated, the arrangement is such that a drive element 29 is provided for each link of the conveyor chain having vertically disposed wheels 9 and is arranged to engage behind and drive on the connecting piece 8 at the leading end of the link.

Manifestly, the connecting pieces 8 must be hard wearing; they may therefore be made of sintered nickel iron, in which event they are also self-lubricating.

It is found in practice that, in order to prevent undesirable pivoting of a driven link about axle 10 during driving, it is advisable to provide a restraining pad which acts on the rear portion of the link. This member comprises a U-form plate 33 identical to plate 30 and connected between chains 26 in the same manner as the latter. A rectangular metal pad 34 is welded inside the base of plate 33 and is arranged to bear against the rear end of a driven link to prevent upward movement thereof as mentioned above.

It will be noted from FIG. 1 that, in view of the fact that the driving part of each drive dog 32 is positioned on the center, or pitch, lines of the chains 26 and that these center lines are in the same plane as the chain 1, these elements 32 can successively disengage from links of the chain at the end of their driving run without imparting any undue acceleration to the conveyor chain 1 as in prior arrangements.

I claim:

1. A conveyor system of the kind which includes a linear travelling conveyor element and a plurality of load carriers depending from said element, wherein the improvement comprises a drive unit for the conveyor element, this unit comprising: a pair of endless driving elements; and drive dogs carried between said elements for engagement with the conveyor element, wherein the driving elements are arranged to travel in separate, substantially identical closed paths having a pitch line passing through straight and curved portions and, which are located in parallel planes on opposite sides of the conveyor element, wherein along a part of each of said paths the driving elements travel alongside the conveyor element such that the said parts of each path and the conveyor lie in a common plane, the said drive dogs being located to be brought into engagement with the conveyor element substantially or said pitch line as the driving elements enter the said common plane and are disengaged as the elements leave the said common plane.

2. A conveyor system according to claim 1, wherein each driving element is constituted by an endless chain which extends around a pair of sprockets adjacent the path of the conveyor element so as to define two parallel rectilinear runs, one rectilinear run of each chain extending parallel to the conveyor element and in the same plane as the latter and thereby lying in said part of its respective path, and at least one of said sprockets for each chain being driven to cause both chains to circulate in the same direction.

3. A conveyor system according to claim 2, wherein each drive dog is mounted on a carrier component connected between the two driving chains, the drive dogs projecting outwardly from the latter so as to engage the conveyor element from above at appropriate times.

4. A conveyor system according to claim 3, wherein each carrier component is of U-shape, the legs of the U pointing outwardly away from said path, said carrier being connected at its sides to the respective driving chain.

5. A conveyor system according to claim 1, wherein the conveyor element comprises a plurality of wheeled links connected together end to end, each link defining a recess to receive a drive dog at appropriate times, and each such dog being constituted by a finger of complementary cross section to the recesses in the links.

6. A conveyor system according to claim 5, wherein each conveyor element link is mounted on a single, central wheel-carrying axle, and wherein the said recess for engagement by a drive dog is located adjacent one end, restraining means carried by the driving elements of the system being provided to bear down on a driven link adjacent its end remote from said recess to prevent pivoting thereof.

7. A conveyor system according to claim 5, wherein each alternate link is positioned in a plane at right angles to the intervening links, the drive dogs being arranged to engage the recesses in alternate links.

* * * * *